United States Patent [19]

Blanc et al.

[11] Patent Number: 4,797,547

[45] Date of Patent: Jan. 10, 1989

[54] OPTICAL FIBRE MONITORING DEVICE USING A SYNCHRONIZATION SELECTOR TO CHANNEL OPTICAL SIGNALS

[75] Inventors: Floréal Blanc, Verrieres le Buisson; Claude Bonnejean, Courcouronnes, both of France

[73] Assignee: Commissariat a l'Energie Atomique, Paris, France

[21] Appl. No.: 50,461

[22] Filed: May 18, 1987

[30] Foreign Application Priority Data

May 30, 1986 [FR] France ............................... 86 07809

[51] Int. Cl.⁴ ............................................... G01V 9/04

[52] U.S. Cl. ................................. 250/221; 250/222.1; 340/556

[58] Field of Search ..................... 250/221, 221.1, 227; 340/555, 556, 557

[56] References Cited

U.S. PATENT DOCUMENTS

| | | | |
|---|---|---|---|
| 3,711,846 | 1/1973 | Schlisser et al. | 340/557 |
| 4,207,466 | 6/1980 | Drage et al. | 340/556 |
| 4,277,727 | 7/1981 | LeVert | 250/221 |
| 4,292,628 | 9/1981 | Sadler | 340/555 |
| 4,322,721 | 3/1982 | Perren | 340/556 |

*Primary Examiner*—David C. Nelms
*Assistant Examiner*—William L. Oen
*Attorney, Agent, or Firm*—Oblon, Fisher, Spivak, McClelland & Maier

[57] ABSTRACT

An improved optical fiber monitoring system using a light-emitting diode which is controlled by a module 12 having an oscillator 40, a first JK trigger 42, two univibrators 44, 46 and a second JK trigger 48 with an output stage 43 being connected to one or the other of the two outputs of the first trigger. A synchronization selector 50 is also a part of the module and has four inputs connected to the four output of the two JK triggers and to an output supplying one of the four signals which are received. The photoreceiver is connected to a synchronous detector module which uses the signal supplied by the selector 50 as a synchronization signal. The system also utilizes a inhibit circuit 83 and the control system incorporates a means for detecting the possible failure of the light emitting diode 10 with the controlling means inhibiting the input 83.

9 Claims, 6 Drawing Sheets

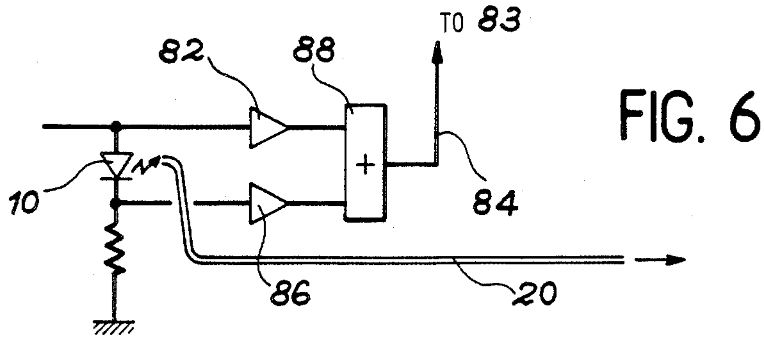
FIG. 6
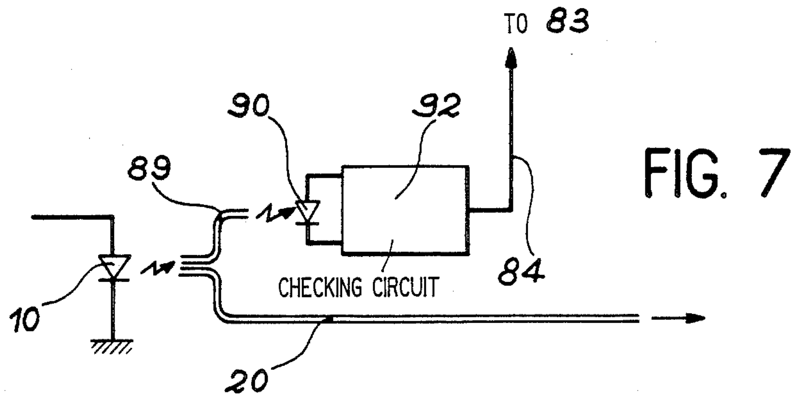
FIG. 7
FIG. 8
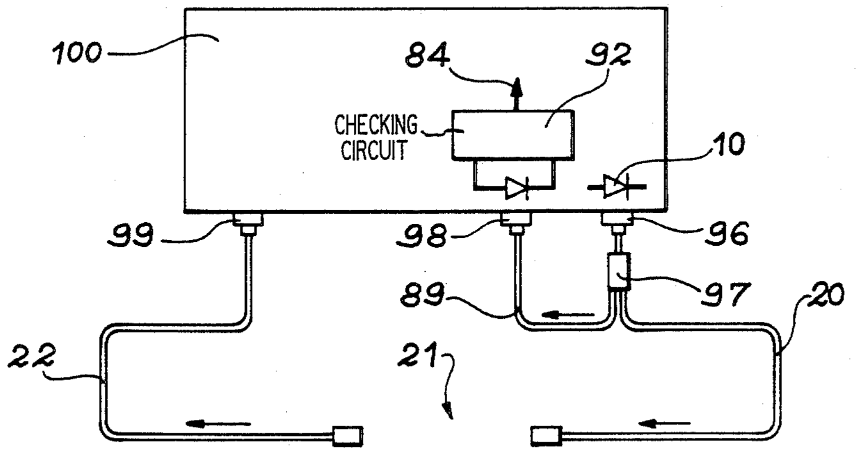

OPTICAL FIBRE MONITORING DEVICE USING A SYNCHRONIZATION SELECTOR TO CHANNEL OPTICAL SIGNALS

BACKGROUND OF THE INVENTION

Field of the Invention

The present invention relates to an improved optical fibre monitoring device.

An optical fibre monitoring system uses two essential components, namely a light source and a photoreceiver. In the case of a device of the "direct barrier" type, the photoreceiver faces the source. In the case of a so-called "reflex" barrier, a catadioptric reflector is also positioned facing the source and the photoreceiver is positioned alongside the latter. This arrangement can even be used without a reflector, if it is the reflectivity of the object to be detected which is used and then a so-called "proximity" optical system is obtained.

The advent of optical fibres made it possible to improve such devices. Thus, optical fibres have interesting qualities, such as insensitivity to electromagnetic interference and inviolability of the information carried by them. In the case of silica fibres, there are additional advantages such as the limited attenuation in the near infrared, the ease of fitting (due to the small diameter and great flexibility), the good thermal behaviour and the good resistance to chemical action and radiation. Moreover, optical fibres have been recently used not only in telecommunications, but also in the construction of monitoring devices. They have varied applications, such as the detection of intrusions, the detection and counting of objects, security, etc.

The following table gives an idea of the scope obtained with existing commercial devices, as a function of the core diameter of the fibre used and as a function of whether or not end optics are available in the three aforementioned barrier types.

| System type | 200 μm fibres without end optics | 1 to 2 mm fibres without end optics | Fibres with end optics, dia. 30 to 40 mm |
|---|---|---|---|
| Direct barrier | 3 to 10 cm | 5 to 50 cm | 5 to 50 m |
| Reflex barrier | 1 to 20 cm | 2 to 100 cm | 1 to 50 m |
| Proximity | <2 cm | <10 cm | <0.5 m |

200 μm fibres generally have a silica core and a plastic sheath, or a silica core and a silica sheath, in a structure similar to that of the multimode fibres used for telecommunications purposes. The optical attenuation introduced by them remains negligible for lengths below about 100 meters.

1 to 2 mm fibres are either plastic fibres (being the least expensive), or bundled glass fibres. The attenuation introduced by them can reach several dB/m, which leads to a significant decrease in the effective scope of the associated system when using non-negligible fibre lengths (several meters).

FIG. 1 diagrammatically shows the structure of an optical fibre monitoring device. Such a device comprises a lightemitting diode 10 coupled to an optical transmission fibre 20, a photoreceiver 14 coupled to an optical reception fibre 22 and a control system 15. This system comprises a module 12 for controlling the emission of the light-emitting diode 10, a preamplifier module 16 connected to a photoreceiver 14 and a module 30 for processing the preamplified signal connected to preamplifier 16. System 15 also comprises a block 36 for supplying the different modules, indicator lights 32 and outputs 34 (analog and/or logic).

Volume 21 between the free ends of the transmission and reception fibres 20, 22 respectively corresponds to the monitoring zone.

SUMMARY OF THE INVENTION

The present invention relates to an improvement to such devices. To this end, it provides a special embodiment of the transmission or emission module 12 and the processing module 30, by means of which the light beam is modulated on an all or nothing basis on transmission and demodulated according to a synchronous demodulation process on reception. The parameters of the circuit have been chosen for an optimum signal to noise ratio. Thus, an increase in the scope by a factor of 20 to 50 has been obtained compared with existing systems, whose performance details are given in the preceding table.

According to another object of the invention, there is a system for inhibiting the alarm signal in the case of a failure of the light source. This improves the operating reliability of the system.

Finally, according to another object of the invention, a specific fibre end fitting is provided for preventing unwanted signals and for improving the detection conditions.

BRIEF DESCRIPTION OF THE DRAWINGS

The characteristics and advantages of the invention can be better gathered from the following description of non-limitative, illustrative embodiments and with reference to the attached drawings, wherein show:

FIG. 6 An electrical means for checking the satisfactory operation of the light-emitting diode.

FIG. 7 an electrooptical means for checking the satisfactory operation of the light-emitting diode.

FIG. 8 The fitting of the complete device with the electrooptical checking means.

DETAILED DESCRIPTION OF THE PREFERRED EMBODIMENTS

Figure 2:
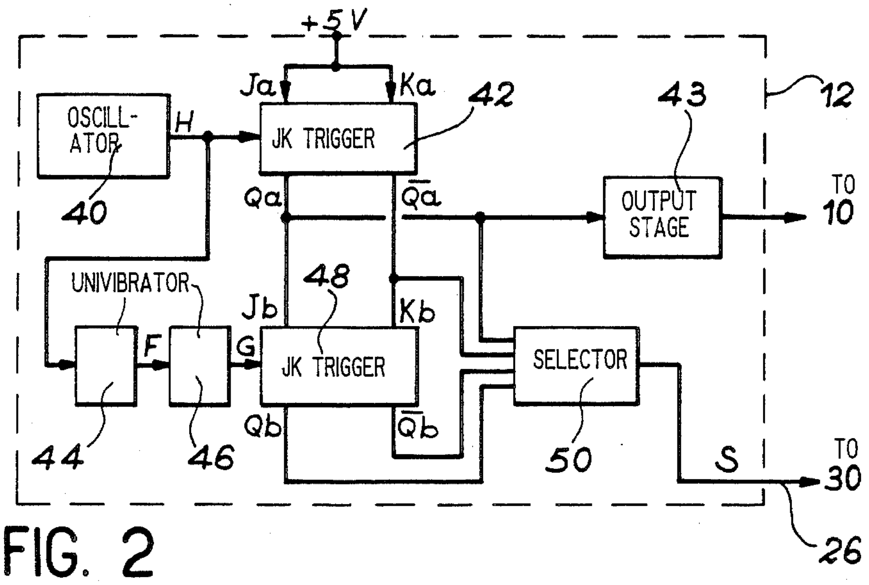
FIG. 2 The diagram of a transmission control module according to the invention.

The light-emitting diode emission control module 12 is shown in FIG. 2 and comprises an oscillator 40 producing a pulse train H having a repetition rate 2F, a first JK trigger 42 having an input connected to the oscillator 40 and two complimentary outputs supplying two complimentary logic signals Qa and $\overline{Qa}$ of repetition rate F. The module also comprises a first univibrator 44 connected to the oscillator and supplying a signal F, a second univibrator 46 connected to the first univibrator 44 and supplying a signal G, a second JK trigger 48 having an input connected to the second univibrator 46 and two complimentary outputs supplying two complimentary logic signals Qb and $\overline{Qb}$. A synchronization selector 50 has four inputs respectively connected to the four outputs of the two JK triggers 42, 48 and an output supplying any one of the four signals Qa, $\overline{Qa}$, Qb, $\overline{Qb}$. The module is completed by an output stage 43, whose input is connected to the first output of the first JK trigger 42 and which receives the signal Qa and the output is connected to light-emitting diode 10.

Figure 3:
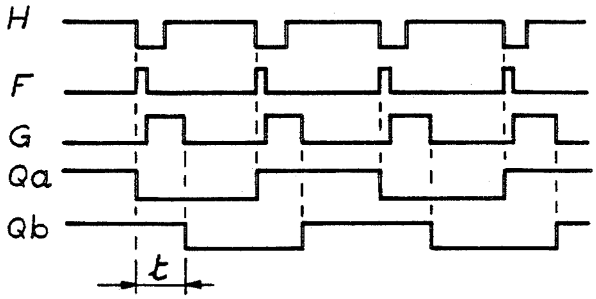
FIG. 3 A diagram showing the evolution of certain electrical signals appearing in the preceding module.

FIG. 3 shows the configuration of signals H, F, G, Qa, and Qb

It can be seen that the pulses Qa and Qb are staggered with respect to one another by a time t, which can be regulated with the aid of univibrators 44, 46. Thus, it is possible to obtain, as the synchronization signal, a pulse whose rising front is synchronous with the rising front of the pulse of the reception signal, no matter what the time lags and phase inversions introduced by the reception circuits.

Figure 4:
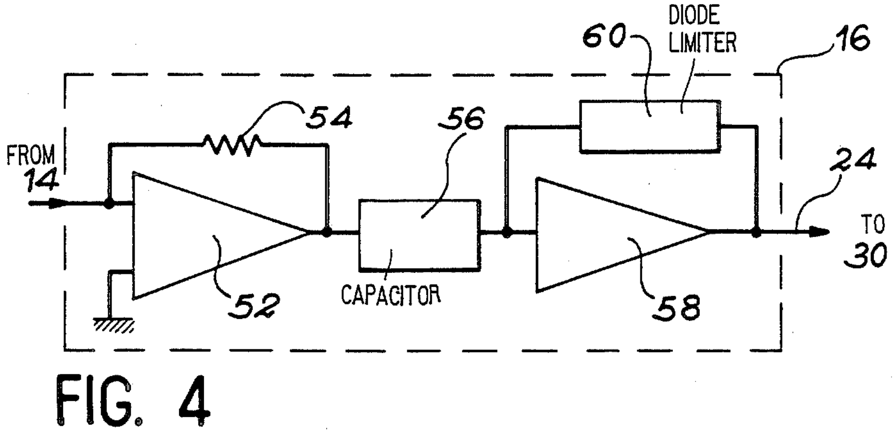
FIG. 4 The diagram of a preamplifier module.

The synchronization signal is finally carried by a connection 26 up to the synchronous detection module 30, which is preceded by a preamplifier module illustrated in FIG. 4.

This module comprises a current-voltage amplifier 52, whereof the input is connected to photoreceiver 14. Said amplifier comprises a feedback-connected resistor 54. It is coupled by a capacitor 56 to a voltage amplifier 58 equipped with a feedback-connected diode limiter 60. The output of amplifier 58 supplies a preamplified signal carried by connection 24 to detection module 30.

Figure 1:
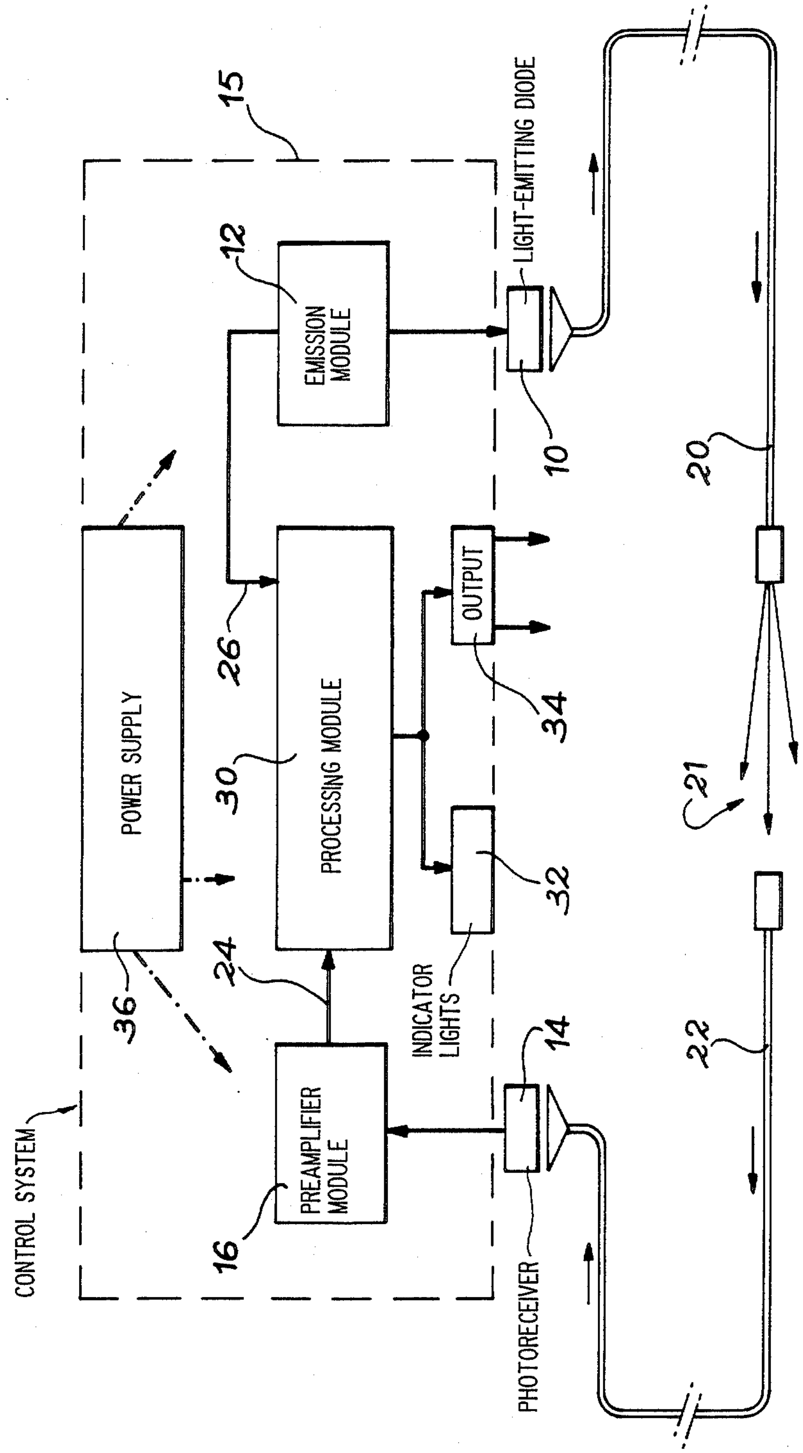
FIG. 1 already described, a block diagram of an optical fibre monitoring device.
Figure 5:
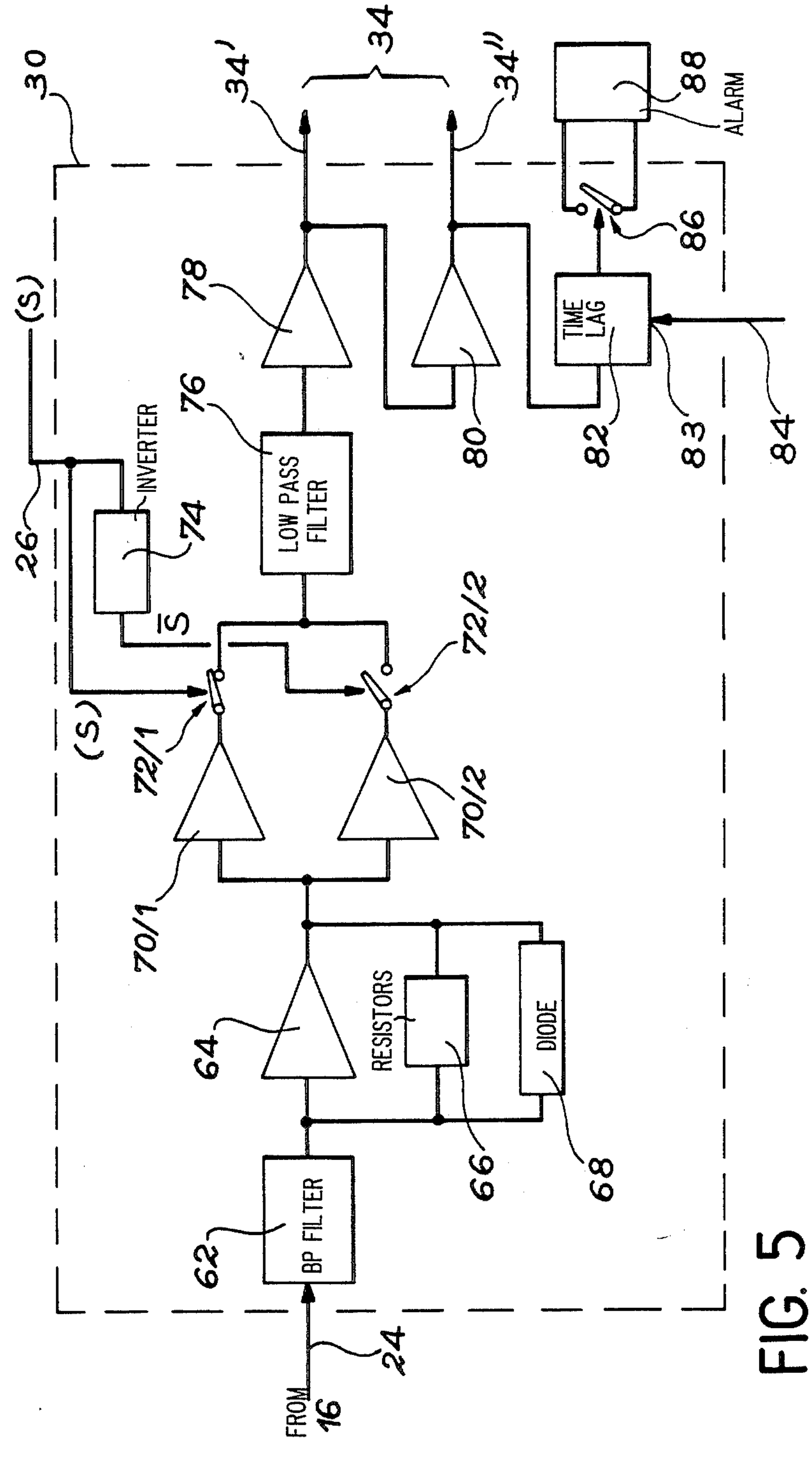
FIG. 5 The diagram of a processing module which, according to the invention, uses synchronous detection.

The diagram of the latter is given in FIG. 5 and, as shown, the module comprises an input connected to the output of preamplifier module 16 by connection 24, a band pass filter 62, an amplifier 64 connected to the filter and whereby said amplifier comprises, in feedback-connected manner, a gain selector 66 formed by resistors and a diode limiter for preventing the saturation of the following circuits. The actual synchronous detection circuit comprises two complimentary channels, each having an amplifier 70/1, 70/2 respectively of gains +G and −G and a sampler respectively 72/1, 72/2. These samplers are respectively controlled by the synchronization signal, as supplied by the synchronization selector 50 and by a complimentary signal obtained as a result of a logic inverter 74. The represented circuit also comprises a low pass filter 76 connected to the two samplers 72/1, 72/2, an amplifier 78 having an output constituting an analog output 34' for processing module 30, a threshold circuit 80 connected to amplifier 78, said circuit having an output constituting a logic output 34" for processing module 30. The two outputs 34' and 34" constitute the outputs 34 represented in FIG. 1.

In an advantageous embodiment, the processing module 30 also comprises a time lag circuit 82 connected to the output of the threshold circuit 80. This time lag circuit has an inhibiting input 83 and an output connected to an alarm circuit constituted by a rely 86 and a sound or visual alarm 88.

The detection module is able to extract from the noisy signal which it receives the information constituted by the component at frequency F, which is the exciting frequency of the light-emitting diode. Filter 62 is a band pass filter centred on this frequency.

The output of time lag circuit 82 can be inhibited by means of a signal applied to inhibiting input 33. This signal is produced by a device for detecting the possible failure of the light-emitting diode. Two embodiments of this device are illustrated in FIGS. 6 and 7.

It is possible to see in FIG. 6 the light-emitting diode 10, which emits in optical fibre 20 and an electrical circuit comprising an amplifier 82 receiving the voltage applied to the diode and/or an amplifier 86 receiving a signal corresponding to the current flowing in the diode. A comparator circuit 88 makes it possible to release a signal on a connection 84 in the case of an abnormality of the voltage and/or current. It is this signal which is applied to the inhibiting input 83 of circuit 82 of FIG. 5.

With regards to the means illustrated in FIG. 7, it is of an optoelectronic nature, in the sense that it comprises an auxiliary optical fibre 89 sampling part of the light emitted by diode 10, a photoreceiver 90 and a checking circuit 92. In the case of any abnormality in the light emitted by the diode, circuit 92 supplies a signal on connection 84, which will inhibit circuit 82.

In practice, it is possible to use an arrangement like that shown in FIG. 8. The represented device comprises an emission connector 96 facing diode 10, a Y-shaped coupler 97 and two fibres 89 and 20, the first being returned into system 100 by an auxiliary connector 98. Checking device 92 is located in system 100. Moreover, reception fibre 22 is connected to said system by a third connector 99.

Hereinbefore use has been made of a transmission or emission fibre and a reception fibre which are separate. However, the invention is naturally not limited to this case. It is also possible to use a common fibre for the outward and return paths, as illustrated in FIGS. 9 and 10.

Figure 9:
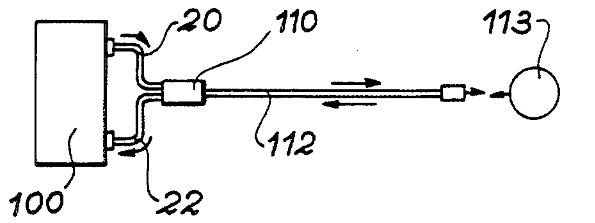
FIG. 9 A device with a single optical fibre functioning on the basis of proximity detection.

In FIG. 9, a Y-shaped coupler 110 makes it possible to combine fibres 20 and 22 into a single fibre 112, which guides both the emission beam and the reception beam. In the embodiment of FIG. 9, the device functions as a proximity detector and the object 113 to be detected must be located towards the end of the single fibre 112. Through the use of a catadiopter, a reflex barrier operation can also be obtained.

Figure 10:
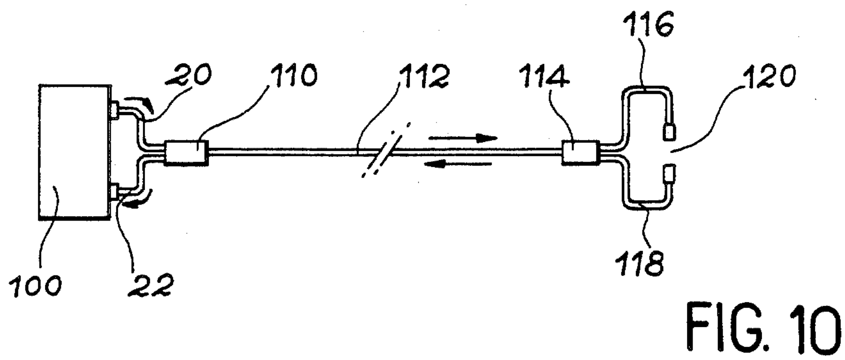
FIG. 10 a device with a single optical fibre operating on the basis of direct barrier detection.

The device of FIG. 10 functions slightly differently due to the use of a second Y-coupler 114, which makes it possible to subdivide the single fibre into two fibres 116, 118. The gap or interval 120 is the detection zone and the device then functions in a "barrier" mode.

Figure 11:
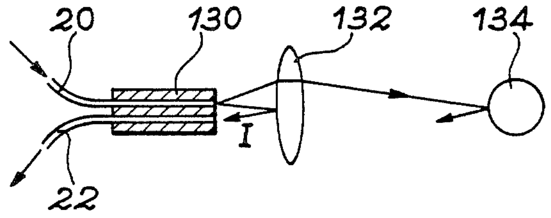
FIG. 11 A detail of the end of an optical detection device.

FIGS. 11 and 12 again relate to a device with two separate fibres, namely one for emission 20 and the other for reception 22. At their end, said fibres are joined in a sleeve-like end fitting 130, which has two channels for permitting the passage of the fibres. A lens 132 is advantageously placed in front of the end fitting. The object 134 to be detected is positioned in front of the lens. The light beam from the emission fibre is "focused" in the area where the object is liable to be and the beam reflected by it is partly reintroduced into reception fibre 22.

However, this arrangement can suffer from a disadvantage due to the fact that part I of the incident light is reflected on the entrance face of lens 132 and consequently gives rise to a return beam, which could give the idea of the permanent presence of an object.

Figure 12:
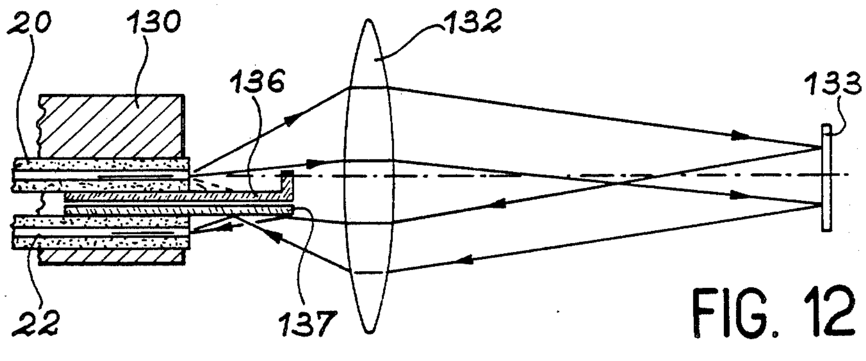
FIG. 12 An improved end fitting according to the invention using an optical cover.

In order to prevent this disadvantageous effect, it is obviously possible to treat the optics with a reflectioninhibiting coating, but also a cover can be positioned at the end of the end fitting and as indicated in FIG. 12. Cover 136 is formed by a plate substantially located in the median plane of fibres 20 and 22. Preferably, the channel to receive the emission fibre is perforated in the axis of end fitting 130 and lens 132 is centred on said axis. The beam emanating from the end of emission fibre 20 then opens out in accordance with the rays indicated in the drawing. The beam partly reflected by the entrance face of lens 132 is intercepted by the cover and can consequently not be introduced into the reception fibre. An optimization of this principle is made possible by the addition of a mirror 137. Thus, the rays reflected by the object to be detected or by reflector 133 tend to converge towards the end of the emission fibre, but many of them are intercepted by mirror 137, where they are reflected and then effectively converge towards the zone symmetrical of the end of the emission fibre with respect to the plane of the mirror.

For optimum operation, it is precisely at this point where the end of the reception fibre must be located. In practice, the effect of the mirror can be obtained by making the rear face of the cover 136 reflecting by optical polishing with or without the deposition of a coating. The function of the emission and reception fibres can be inverted.

Figure 13:
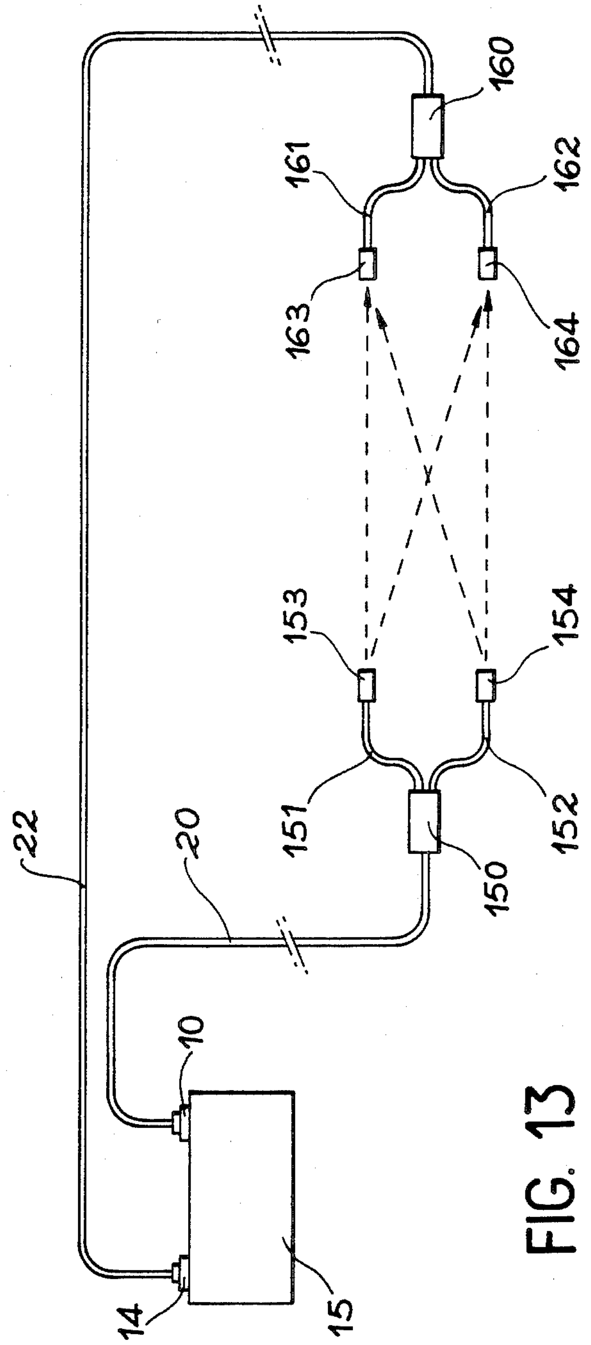
FIG. 13 A variant in which the optical transmission and reception fibres are split.

FIG. 13 shows an emission fibre 20 split up, with the aid of a Y-shaped coupler 150, into two fibres 151, 152 terminated by two emission end fittings 153, 154. In the same way, the reception fibre is split up, with the aid of the Y-shaped coupler 160, into two fibres 161, 162 terminated by two reception end fittings 163, 164. The light beams emitted by each of the end fittings 153 and 154 are received by the reception end fittings 163, 164, either directly or in crossed manner. In other words, end fitting 163 can receive light both from end fitting 153 and end fitting 154. Thus, the covering or obturating of an emitter or receiver for any random reason (dust, insects, etc.) does not trigger the alarm signal, because the other emitter or receiver remains in service. In order that such an alarm is given, it is necessary that the two paths (direct and crossed) are simultaneously interrupted. A value which is a function of the installation is given to the gap between the two emitters, e.g. 20 cm. It is naturally possible to use more than two emission and reception fibres, e.g. three or four.

We claim:

1. An optical fiber monitoring device comprising:
a light emitting diode coupled to an optical emission fiber;
a photoreceiver coupled to an optical reception fiber;
a control system comprising an emission control module for controlling the emission of the light-emitting diode, a preamplifier module connected to a photoreceiver and a processing module for processing a preamplified signal wherein said processing module is connected to said preamplifier module, and
wherein said emission control module comprises an oscillator producing a pulse train having a first repetition rate, a first JK-type trigger having an input connected to said oscillator and two complementary outputs supplying a first set of two complementary logic signals Qa, $\overline{Qa}$ of a second repetition rate which is one half of the first repetition rate, a first univibrator connected to said oscillator, a second univibrator connected to said first univibrator, a second JK-type trigger having an input connected to said second univibrator and a second set of two complementary outputs supplying a second set of two complementary logic signals Qb, $\overline{Qb}$, a synchronization detector having four inputs respectively connected to the four outputs of said two JK triggers and wherein said synchronization detector has an output supplying one of said two sets of two complementary logic signals Qa, $\overline{Qa}$, Qb, $\overline{Qb}$, an output stage connected to the first output of said first JK trigger and receiving the signal Qa and having an output connected to said light emitting diode, and
wherein said processing module is a synchronous detection type processing module comprising an input connected to the output of said preamplifier module, a band pass filter, an amplifier connected to said filter, a synchronous detection circuit comprising two complementary channels wherein each of said complementary channels comprises an amplifier and a sampler with said samplers being respectively controlled by the synchronization signal supplied by said synchronization selector and by the complementary signal obtained by a logic inverter, a low pass filter connected to said two samplers, an amplifier providing an analog output for said processing module, and a threshold circuit connected to an amplifier and having an output of said threshold circuit which constitutes a logic output for said processing module and wherein said processing module further comprises a time lag circuit connected to the output of said threshold circuit and an inhibiting input and an output connected to an alarm circuit wherein said control system further includes a means for detecting the possible failure of said light-emitting diode and wherein said means for detecting providing an output to said inhibiting input.

2. Device according to claim 1, wherein said means for detecting the failure of the light-emitting diode comprises an electronic means which is sensitive to the voltage applied or to the current passing in the light-emitting diode.

3. Device according to claim 1, wherein said means for detecting the failure of the light-emitting diode comprises an optical means sensitive to the light emitted by the diode.

4. Device according to claim 1, wherein said emission fibre and reception fibre are joined at their end by a sleeve-like end fitting having two channels permitting the passage of the fibres.

5. Device according to claim 4, wherein said end fitting is extended by an optical cover formed by a flat plate disposed in the median plane separating the two ends of the emission and reception fibres respectively.

6. Device according to claim 5, wherein said emission fibre is centered in the axis of end fitting and cover comprises at least one reflecting face.

7. Device according to claim 1, wherein said emission fibre and reception fibre are combined into a single fibre, said fibre being coupled to one end of a Y-shaped optical coupler, the two ends of the two branches of the Y being connected by two optical fibres respectively to the light-emitting diode and to the photoreceiver.

8. Device according to claim 7 wherein the end of the single fibre opposite to the end equipped with an optical coupler is also provided with a Y-shaped optical coupler having two emission-reception optical fibres connected to the ends of the two branches of the Y.

9. Device according to claim 1, wherein said emission and reception fibres respectively are at least split into two by the Y-couplers.

* * * * *